United States Patent [19]
Perrotto

[11] Patent Number: 4,964,764
[45] Date of Patent: Oct. 23, 1990

[54] FLOATING CHUCK WITH IRRIGATING FLOW

[75] Inventor: Andre Perrotto, Charly Vernaison, France

[73] Assignee: S M P 2 (Societe Anonyme de Droit Francais), Bron, France

[21] Appl. No.: 431,242

[22] Filed: Nov. 3, 1989

[30] Foreign Application Priority Data

Nov. 3, 1988 [FR] France ............................ 88 15774

[51] Int. Cl.⁵ .................................... B23B 51/06
[52] U.S. Cl. ............................. 409/136; 279/16; 279/20; 408/57
[58] Field of Search .................. 279/16, 20; 408/56, 408/57, 59, 127; 409/136; 10/89 F, 141 H

[56] References Cited

U.S. PATENT DOCUMENTS

| | | | |
|---|---|---|---|
| 2,767,564 | 10/1956 | Green | 279/16 |
| 4,082,472 | 4/1978 | Mossner et al. | 279/20 |
| 4,396,317 | 8/1983 | Staron et al. | 279/20 |
| 4,640,652 | 2/1987 | Rivera, Jr. | 279/20 |
| 4,740,116 | 4/1988 | Wellach | 279/20 |

*Primary Examiner*—Daniel W. Howell
*Attorney, Agent, or Firm*—Oliff & Berridge

[57] ABSTRACT

A floating chuck incorporating a fluid path for irrigation fluid is disclosed. Fluid passages in the body and bush are connected by a rigid tube floatingly mounted by O-rings at each end. The O-rings are in fluid-sealing relationship with opposed, enlarged end sections of the fluid passages. The tube is shorter than the distance between the inner ends of the enlarged sections. Axial displacement and angular displacement of the bush relative to the body are accomplished without compromise to the fluid supply. The arrangement provides smoothness of movement between the bush and body and has low maintenance costs.

6 Claims, 2 Drawing Sheets

FIG_4
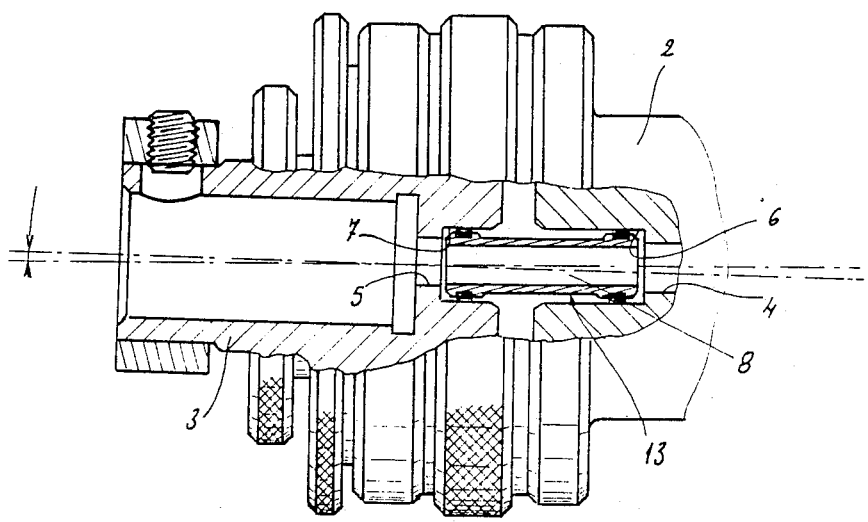
FIG_2
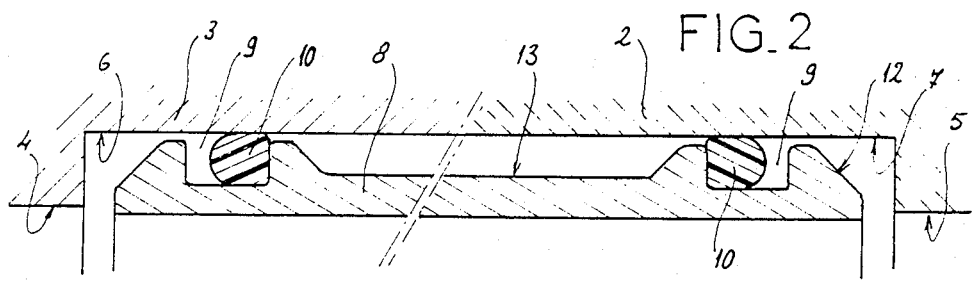

FLOATING CHUCK WITH IRRIGATING FLOW

FIELD OF THE INVENTION

The field of the present invention is machine tools and specifically a floating chuck with an irrigating fluid supply feature.

BACKGROUND OF THE INVENTION

In certain machine tools, such as semi-automatic lathes, center lathes, or drill presses, despite the precision of the machines, it is difficult to perfectly align the axis of the element supporting the boring tool with the axis of the bore to be produced. One of the main causes of these difficulties arises from temperature variations caused by heating, which take the form of uncontrollable expansion phenomena.

To ensure good alignment between the boring tool and the bore, it is known that a floating chuck can be used which automatically and geometrically compensates for errors in alignment as well as angularity.

In known fashion, the tool-carrying bush is coupled to the body of the chuck by an Oldham coupling and moves on bearings associated with this coupling. The chuck can therefore shift laterally relative to the body, while maintaining perfect parallelism with the axis of the chuck.

Some boring tools have a central channel, allowing passage of an irrigating fluid. The liquid brought to the end of the chuck shank must be transferred to the bush which serves to hold the tool. Such a transfer is difficult to accomplish in a simple and efficient manner, in view of the requirements for radial and angular displacement between the body and the bush. To ensure a good seal, without interfering with the ability of the bush to shift out of alignment, it is necessary to employ an assembly of joints with a complex structure, including tapered connections. These parts are subject to wear and must be replaced frequently.

To overcome this disadvantage, a method has been devised for providing a passageway for the fluid in the body of the bush by using a flexible, fluid tight connecting tube. However, this tube, because of the materials used, cannot withstand high pressure. In addition, under the influence of the working pressures transmitted by the tool, it becomes a stiffening element which interferes with radial displacement, with consequent angular misalignment of the body and the bush.

SUMMARY OF THE INVENTION

The object of the present invention is to overcome these disadvantages by providing a device of simple design for supplying irrigating fluid, which does not require any particular maintenance and which ensures an excellent seal without interfering with the lateral and angular movements of the bush.

For this purpose, end zones, opposite and coaxial with respect to the channels which serve to carry the irrigating fluid, are formed in the body and in the bush. The end zones have a section which is expanded relative to the remainder of the length of the channels, each such section serving to accommodate one end of a straight, rigid, nondeformable tube. The tube has a groove in its external wall and near each of its ends. Each groove accommodates an O-ring made of a deformable material, the outside diameter of said ring being greater than the inside diameters of the end zones of the channels. The length of straight tube is shorter than the distance between the ends of the two end zones of the channels in the body and the bush.

The O-rings ensure a fluid tight passage of fluid from the body to the bush, with the axial centering of the tube between seats formed in the end zones of the channels, and provide friction-free points of articulation during misalignment of the bush relative to the body. In addition, this device does not generate any axial constraint resulting from the mechanical pressures exerted on the tool, since the O-rings ensure floating assembly of the tube, with equalization of the pressure on both sides of the tube.

Finally, few parts are required and the design is not complex.

Advantageously, each groove made near one end of the tube is wider than the diameter of the O-ring which it accommodates. This allows deformation of the O-ring when the external part abuts the wall of the enlarged section of a channel for passage of the liquid, as well as tilting of the tube relative to this O-ring during movements involving radial displacement and angular misalignment. Because of this characteristic, these movements are accomplished with considerable smoothness.

According to another characteristic of the invention, the ends of the tube are beveled and each has a tapered shape which facilitates installation of the corresponding O-ring and avoids damaging the latter during this operation.

Advantageously, each O-ring is made of a material which is resistant to temperature, high pressure, and attack by hydrocarbons, for example a copolymer such as that known by the trade name VITON.

To ensure a satisfactory range for lateral displacement of the tube, the outside surface of the latter is relieved at its central part.

In any event, the invention will be clearly understood from the following description which refers to the attached schematic diagram which shows, as a nonlimiting example, one embodiment of this device:

BRIEF DESCRIPTION OF THE DRAWINGS

FIG. 2 is a lengthwise section on an enlarged scale of a portion of the two ends of the central tube for transporting the liquid;

FIGS. 3 and 4 are two views similar to FIG. 1, one showing a lateral shift and the other an angular shift of the bush relative to the body.

DESCRIPTION OF THE PREFERRED EMBODIMENT

Figure 1:
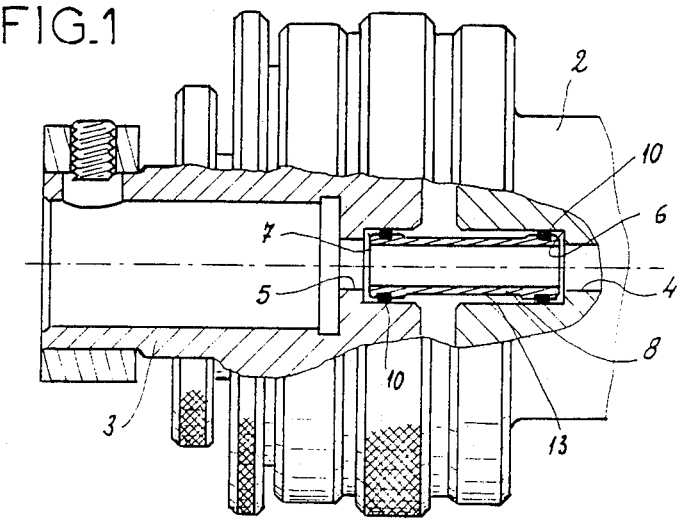
FIG. 1 is a lengthwise section with the tool-holding bush and the body

The chuck shown in the drawing comprises a body 2 designed to be mounted between a machine tool and a bush 3 for holding a tool. The bush is mounted in the body using traditional means which are not described.

This chuck is designed to allow sealed passage of an irrigating fluid from body 2 into the interior of chuck 3. To this end, body 2 has a central and axial channel 4 and chuck 3 has a central and axial channel 5.

The end sections 6 and 7 respectively of channels 4 and 5 have the same cross section, enlarged relative to that of channels 4 and 5. The connection between channels 4 and 5 is made by a tube 8 which is rigid and pressure-resistant and is resistant to degradation by the irrigation fluid. The length of this tube is less than the distance between the respective ends of enlarged areas 6 and 7.

Near each of these ends, tube 8 has two grooves 9, each serving to accommodate an O-ring 10, whose outside diameter is greater than the diameter of enlarged sections 6 and 7.

In addition, the diameter of the O-ring is less than the width of a groove 9. In order to facilitate the accommodation of each O-ring in a groove 9, the ends of tube 8 have bevels 12. Finally, the central part of tube 8 has a relieved portion 13 in its outer wall.

During installation of the chuck, tube 8 is positioned inside said chuck so that O-rings 10 abut the walls of areas 6 and 7 of channels 4 and 5, respectively. When the pressurized liquid is introduced into channel 4, tube 8 is at equilibrium since the two O-rings 10 are subjected to two counter fluid pressures on their opposite faces.

Figure 3:
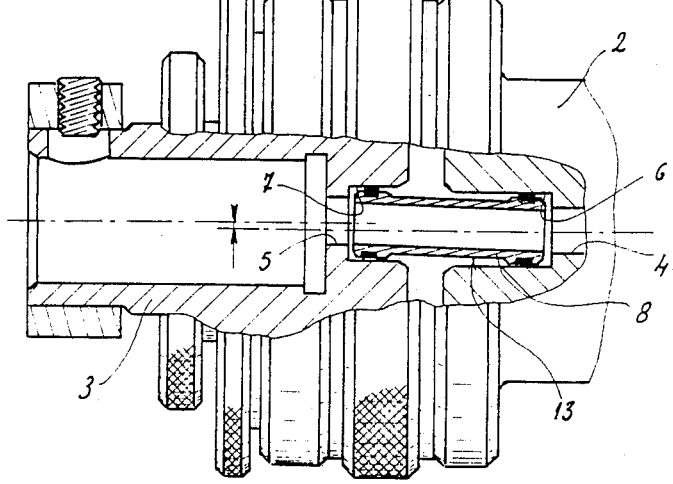

FIG. 1 shows the chuck in a position in which bush 3 and body 2 are aligned. FIGS. 3 and 4 show this same bush following, respectively, radial displacement of the bush relative to the body and angular misalignment of the bush relative to the body.

These various movements are permitted while ensuring passage, with a seal, of the irrigating fluid inside tube 8 by tilting tube 8 around O-rings 10 fitted on its ends.

As indicated by the above, the invention represents a considerable improvement to existing technology, by providing a device having a very simple design, using a very much smaller number of parts, providing a static seal capable of withstanding pressure, providing considerable smoothness in operation, and imposing no axial constraint caused by the pressure of the adjustments of the bush relative to the body.

Of course, the invention is not limited to the single embodiment of this device described below as an example; on the contrary, it includes all variations on this design.

What is claimed is:

1. A floating chuck comprising,
   a body having a first fluid channel therein,
   a bush movably mounted relative to the body and having a second fluid channel therein opposite to and approximately coaxial with the first fluid channel,
   the first channel having an enlarged end sections and the second channel having an enlarged end section opposite the enlarged section of the first channel,
   a rigid, non-deformable tube extending from the enlarged section of the first channel to the enlarged section of the second channel,
   a circumferential, deformable sealing member disposed near each end of the tube received within an associated enlarged section, the outside diameter of each sealing member being greater than the inside diameter of the section in which the sealing member is received, and
   the tube being shorter than the axial distance between the inner ends of the opposed enlarged sections.

2. A chuck as in claim 1, wherein the tube includes a groove disposed on the exterior surface of each end thereof.

3. A chuck as in claim 2, wherein the sealing members are O-rings and are received in each of the grooves, and wherein the width of each groove is wider than the diameter of its associated O-ring.

4. A chuck as in claim 1, wherein the circumferential, deformable sealing members are O-rings of a material resistant to attack by high temperature, high pressure, and hydrocarbons.

5. A chuck as in claim 1, wherein each end of the tube is bevelled.

6. A chuck as in claim wherein the tube has a relieved portion formed in an outer surface.

* * * * *